United States Patent [19]

Shires et al.

[11] 4,051,268
[45] Sept. 27, 1977

[54] DRY LOW CALORIE BEVERAGE CRYSTALS

[75] Inventors: Philip John Shires, Mount Healthy; Timothy James Kennedy, Springfield Township, Hamilton County, both of Ohio

[73] Assignee: The Procter & Gamble Company, Cincinnati, Ohio

[21] Appl. No.: 570,332

[22] Filed: Apr. 21, 1975

[51] Int. Cl.$^2$ .............................................. A23L 1/22
[52] U.S. Cl. .................................. 426/548; 426/590; 426/658
[58] Field of Search ............... 426/548, 590, 591, 658, 426/534

[56] References Cited

U.S. PATENT DOCUMENTS

| | | | |
|---|---|---|---|
| 3,642,491 | 2/1972 | Schlatter | 426/590 |
| 3,930,053 | 12/1975 | Japikse et al. | 426/590 |

Primary Examiner—Raymond N. Jones
Assistant Examiner—C. A. Fan
Attorney, Agent, or Firm—Leonard Williamson

[57] ABSTRACT

Readily soluble dry diet beverage crystals capable of providing a low calorie beverage upon dissolution in water and comprising a matrix of an essential oil flavorant, a dipeptide sweetener, a water-soluble edible gum and crystalline sugar are disclosed. A process whereby a homogeneous slurry of the same ingredients is prepared and dried is also disclosed.

14 Claims, No Drawings

DRY LOW CALORIE BEVERAGE CRYSTALS

BACKGROUND OF THE INVENTION

Previous attempts to produce low calorie foodstuff or beverage compositions have involved the use of artificial sweeteners such as the saccharins and the cyclamates. Problems have arisen with the use of these compounds, however, since saccharins leave a bitter aftertaste and cyclamates are now excluded from commercial food products as health hazards.

It has recently been found that certain dipeptide compounds possess a high level of sweetness. Examples of these compounds are set forth in U.S. Pat. Nos. 3,475,403; 3,492,131; and 3,799,918. Most suitable among these compounds are Aspartame and certain other lower alkyl esters of aspartylphenylalanine.

These dipeptide compounds would appear to have great commercial application as sweeteners since they have up to 200 times the sweetness level of sucrose, have no detectable unpleasant aftertaste, are non-nutritive and can be produced from natural amino acids. Problems have arisen, however, with the use of these compounds in that their rate of solution into water is markedly slower than sucrose. Moreover, they tend to decompose, losing substantially all their sweetness, if subjected to elevated temperatures for extended periods. Also, they have a tendency to decompose when used in combination with certain other materials, particularly acidic materials in liquid beverage systems.

It has recently been disclosed that dipeptide sweeteners are useful sweeteners for foods and beverages. Examples of these applications are set forth in U.S. Pat. Nos. 3,800,046, 3,642,491, and 3,798,204. Dry powdered beverage concentrates based upon dipetide sweeteners admixed with dry flavorants have been disclosed in these references. Co-dried mixtures of dipeptide sweetener and edible bulking agent such as organic acids, starches or sugars as table-sugar substitutes have also been described in U.S. Pat. No. 3,761,288.

While certain of the desired sweetening properties of the dipeptides have been reported, the tendency of these materials to be only difficultly soluble or to undergo degradation upon subjection to elevated temperatures has presented a real limitation on the provision of a diet beverage composition in substantially dry form capable of being readily dissolved in water to provide a flavorful low-calorie beverage.

SUMMARY OF THE INVENTION

The present invention is based in part upon the discovery that a rapidly dissolving dry beverage composition, based upon a dipeptide sweetener, can be realized by the incorporation of the dipeptide sweetener, along with certain essential flavorant and edible gum materials, in a crystalline sugar matrix.

It has now been found that a rapidly-dissolving dipeptide-sweetened dry beverage crystlline matrix can be made from a liquid flavorant and that the desirable flavor qualities of the liquid flavorant are retained in the dry crystalline matrix. It has also been found that the rapidly dissolving dry beverage crystals can be readily prepared by forming a homogeneous slurry of dipeptide sweetener compound, water-soluble edible gum, liquid essential oil flavorant and crystalline sugar matrix; and drying same under conditions of vacuum to provide a matrix having a porous or expanded character. The resulting dry beverage crystalline matrix comprises from 5% to 55% dipeptide sweetener; from 1% to 15% water-soluble edible gum; from 25% to 85% flavorant; and from 7% to 30% crystalline sugar. The dry flavor cyrstals of the present invention undergo rapid dissolution in water, overcoming the characteristic poor solubility properties of the dipeptide sweeteners, and provide, in the case of carbonated water, a low-calorie flavorful soft drink.

DETAILED DESCRIPTION OF THE INVENTION

According to one embodiment of this invention a diet beverage mix having the appearance of crystals is prepared by (1) forming a uniform dry admixture of a crystalline sugar carrier, a dipeptide sweetening agent, a water-soluble edible gum such as sodium carboxymethylcellulose gum; (2) admixing the resulting mixture with a flavorant to form a uniform slurry; and (3) drying the slurry in a manner so as to yield an expanded product which may then, if necessary, be ground to size. Such drying methods as freeze drying and vacuum drying have been found suitable for producing these low calorie flavored crystals.

The dry admixing step is critical to achieve uniform dispersion of the dipeptide sweetener.

The dipeptide sweetener is an essential component of the rapidly dissolving crystalline matrix of the present invention and provides the level of sweetness desired in the beverage prepared therefrom. The dipeptide sweeteners are widely known and examples of suitable dipeptides are described in U.S. Pat. Nos. 3,475,403; 3,492,131; and 3,799,918. Especially suitable are the lower-alkyl esters of aspartylphenylalanine, e.g., N-L-α-aspartyl-L-phenylalanine 1-methyl ester. The sweetener will normally be employed in an amount sufficient to impart desired sweetness and in an amount of from 5% to 55% by weight of the crystalline matrix. Amounts greater than about 55%, while suitable, tend to present a solubility problem owing to the inherently low solubility of the dipeptide sweeteners in water. A preferred amount of the dipeptide is in the range of from 8% to 50% and permits the preparation of a crystalline matrix providing a sweetness level acceptable to most consumers and which is readily dissolved in water.

The edible gums used in the present invention are critical to the attainment of the desired results described herein and have a dual function; they provide "body" to the prepared beverage and act as a carrier for the sweetener. The gums useful in this invention include any of a variety of water-soluble edible cellulose derivatives such as methylcellulose, carboxymethylcellulose, hydroxyethylcellulose, and the like. Vegetable gums such as gum arabic, guar and carrageenan can also be employed. Especially suitable among these gums are the higher-substituted, and higher-viscosity sodium carboxymethylcellulose variety, since with certain of these materials it is possible to produce low calorie, low bulk density, flavored crystals which will dissolve readily in cold water. It has been found that a preferred gum is sodium carboxymethylcellulose having a viscosity of 400–800 centipoises at 2% by weight solution and where 9 carboxymethyl groups are substituted per 10 anhydroglucose units.

The water-soluble and edible gums of the crystalline matrix of the invention are employed in an amount of from 1% to 15% by weight. The edible gum, thus, is employed in an amount sufficient to provide a dispersing function in the provision of a slurry in which the dipeptide sweetener compound is uniformly distributed throughout the flavorant- and sugar-containing slurry. Rapid solubility of the dried dipeptide-containing crystals is thereby promoted. Employment of amounts greater than about 15% tend to provide little additional dispersing or "Body" effects and need not, therefore, be employed. A preferred amount is from 2% to 10% by weight of the crystalline matrix.

As used herein, the term "flavorant" is intended to cover all flavoring materials present in a beverage with the exception of the dipeptide sweetening agent and edible gum. While the sweetening agent and gum do influence markedly the flavor of a given beverage, the characteristic flavor results from the flavoring materials added. These flavoring materials come in the form of alcoholic extracts or essences, aqueous solutions and emulsions, solutions of flavors in glycerol and propylene glycol, and fruit-juice concentrates. Beverage flavor ingredients of an essential-oil character often require extraction with alcohol from the source raw material. Water-soluble flavoring components can be made as aqueous solutions. When necessary, due to the low water solubility, emulsions can be prepared or solutions in glycerol or propylene glycol can be made. Such emulsions or solutions avoid the use of alcohol. Concentrated fruit juices are used in preference to fruit juices themselves, for on dilution with water, greater fidelity of fruit flavor can be obtained.

The "flavorant" material is typically used as a flavor concentrate, or flavor base, and is available in certain standard concentrations. A beverage can be obtained by diluting the flavorant or flavor base to the proper strength for a particular beverage and incorporating the proper sweetener content for that beverage. Of course, if the beverage is obtained from a dry mix of flavored crystals of the invention, it must be dissolved in the proper amount of water. A carbonated beverage can be obtained by adding such a dry mix to pre-carbonated water, or by adding the dry mix to plain water, such as tap water or the like, and then carbonating this aqueous solution. Formulations for various flavorants are well known to those skilled in the art and may readily be obtained from published sources. For example, Merory, *Food Flavorings,* The Avid Publishing Co., (1960), lists various flavorant formulations in Chapter 17, entitled "Syrup and Soda Flavorings"; also, in Jacobs, M.B., *Manufacture and Analysis of Carbonated Beverages,* Chemical Publishing Company (1959), formulations for many fruit and non-fruit flavorants are given. Complete flavorants are also commerically available in standardized concentrations for ease in dilution to the proper concentration for the final beverage. These are commonly known as "2-ounce" or "4-ounce" flavorants depending upon the amount of the base which must be added to a gallon of simple syrup which is then diluted with water to the final beverage strength. (As those skilled in the art will appreciate, a simple syrup is a solution of sugar in water, usually in a standard concentration). Commercially obtained flavorants are typically about 50% solvent, usually water or ethanol, with the flavoring material typical for a particular flavor dissolved therein.

It is an important aspect of the present invention that the crystalline flavor crystals of the invention are prepared from liquid flavorants. The liquid flavorants generally and commercially available in the beverage arts tend to be superior in flavor or quality to those flavor materials which are available as granular or powdered materials. This difference is attributable at least in part to the drying conditions employed in the manufacture of granular or powdered materials and the loss by evaporation of essential and volatile flavor notes which contribute materially to flavor. The crystalline matrix of the present invention is prepared from a liquid flavorant and the intrinsic and superior qualities of the flavorant remain substantially unimpaired in the crystalline matrix of the invention.

While applicants do not wish to be bound as to the precise manner in which the flavor attributes of a superior liquid flavorant are carried through to the dry crystalline matrix of the invention, the nature of the drying conditions employed, the dispersing properties of the flavorant and gum materials employed and the employment of a crystalline sugar material as a matrix through which the remaining ingredients are uniformly carried or dispersed are believed to be involved.

The amount of flavorant present in the crystalline matrix of the present invention comprises from 25% to 85% by weight of the matrix. The flavorant component provides the flavor for the potable beverage which is prepared from the crystals of the invention upon dissolution in water and, accordingly, the amount of flavorant in the crystals will depend upon the particular flavorant employed, the relative flavor potential of the flavorant material, the amount of the flavor crystals employed in a dry beverage mix, and the size serving desired from a given quantity of the dry mix. The amount of flavorant employed will also depend upon the amount of sweetener employed and the capacity of the flavorant to provide the dispersing function necessary to promote the dissolution of the only sparingly soluble sweetener material. Preferred crystals of the invention contain from 30% to 80% of the flavorant material.

The sugar component of the crystals of the invention serves an important function as a carrier or matrix for the dipeptide and flavorant components. Suitable sugars are those which are readily soluble in water and which are capable of being placed into a dry or solid state. The crystalline variety of sugars including, most notably, sucrose, are suited to this purpose. Sucrose being readily soluble and crystalline in form is especially suitable although sugars such as dextrose can be employed. Since the sugar component provides a matrix function and is not relied upon to provide the desired sweetness of the beverage prepared from the crystals of the invention, it will not comprise the predominant portion of the crystals. An amount of sugar of from 7% to 30% of the crystals provides the desired matrix function and allows the crystals to be employed in the preparation of a low calorie beverage. Preferred beverage crystals contain from 10% to 25% sugar.

The amounts of flavorant, dipeptide, and sugar present in the crystals of the invention have been set forth hereinbefore. Their relative amounts, however, reflect certain relationships material to the provision of the desired results set forth hereinbefore. Thus, it will be appreciated that the sugar and dipeptide are present in a ratio of sugar to dipeptide of from about 0.13:1 to 6:1. If a ratio of less than 0.13:1 is employed, the amount of sugar tends to be insufficient to promote the solubility of the sparingly soluble dipeptide. The employment of an amount of sugar in excess of a ratio of 6:1 would utilize sugar primarily as a sweetener rather than for its desired carrier function and would tend to negate the purpose of providing a low calorie beverage composition.

Inspection of the recited amounts of flavorant and sugar will reflect that the ratio of flavorant to sugar in the crystalline matrix is from about 0.8:1 to about 12:1. If a ratio of less than about 0.8:1 is employed, the dipetide sweetener will tend to be insufficiently dispersed by the flavorant, the level of flavor may be insufficient, and the crystals formed upon drying may not be homogeneous in appearance. Similarly, if flavorant is employed in preparation in excess of a ratio of about 12:1 difficulties may be encountered in drying the slurry with separation of discrete phases. Moreover, there may be insufficient sugar to provide the desired function of carrier and solubility promoter.

In accordance with the present invention, and in its process aspect, the flavorant material is admixed with a dry mixture of the sugar carrier, gum, and dipeptide sweetener required for that amount of flavorant to form a thoroughly admixed homogeneous slurry. It has been found that it is essential that the sugar, gum and dipetide sweetener be uniformly dry mixed prior to being formed into a slurry with the liquid flavorant. Uniform dry mixing of the sugar, gum and dipeptide permits thorough mixing and dispersion of the components and facilitates subsequent formation of a homogeneous slurry. It has also been found that in order to obtain the rapidly dissolving dry mix crystals of the present invention, it is necessary that the slurry have a total solids content of from about 50% to about 75%, by weight, and preferably, from about 55% to about 75%, most preferably from about 60% to about 70%, so that the beverage mix produced from the slurry is able to be dried in the proper physical form to achieve rapid dissolution of the particles.

In preparing the flavor crystals of the present invention, liquid flavorant is mixed with the dry pre-mix of sugar, dipeptide and edible gum to provide a homogeneous slurry. Normally, the slurry will comprise from 35% to 70% of liquid flavorant; 2% to 45% dipeptide sweetener; 5% to 30% sugar and from 1% to 15% edible gum. Preferably, the slurry will comprise from 45% to 65% flavorant; 5% to 40% dipeptide; 9% to 20% sugar; and 1% to 10% edible gum.

Any type of conventional mixing means can be used for forming a slurry so long as a thorough mixing and homogeneous mixture is achieved. It is preferred that the mixing means employed beat into the slurry an abundance of air since such an abundance of air will cause foam during drying and correspondingly, result in a lower density product. Also, it is preferred that the temperature of the slurry be kept below about 80° F during admixture to avoid any loss of volatiles or heat degradation of both the dipeptide sweeteners and flavor materials.

Various substances may optionally be added to the mixture in processing it in accordance with the present invention to provide the crystalline matrix of the present invention. For example, the present invention is concerned with a dry diet-beverage mix which will be dissolved in water at the point of consumption. In doing this, the consumer will most likely use tap water which is slightly alkaline due to the mineral salts dissolved therein. Thus, to neutralize this alkalinity, an edible acid may be added to achieve the same beverage pH as that achieved when distilled or de-ionized water is used as the beverage base. Any common food acid, such as citric, malic, or phosphoric may be used for this purpose. Of course, if phosphoric acid is used, it must be properly dried. Other materials which can be used include various additional flavoring ingredients which may be added to the commercial flavorant to modify its flavor, accentuate any especially preferred flavor notes, or replace any flavor notes which may be volatilized and lost during processing into a dry mix. Some of the more common flavoring ingredients which can be added to common beverages, such as a cola beverage, include, for example, extract of coca leaves, neroli oil, lime oil, lemon oil, orange oil, nutmeg oil, vanilla extract or cassia oil. Other flavoring materials for colas or any other desired beverage may be found in published formulation recipes for the particular beverage flavor desired. Other types of materials, such as food colorings, for example, U.S. Certified Food Colors or caramel coloring; stimulants, for example, caffeine; other artificial sweeteners, for example, saccharin; other bodying agents, for example, sorbitol; foaming agents, for example, licorice root extract or saponin-bearing extract of soaproot; or preservatives, for example, sodium benzoate, propylene glycol or ascorbic acid may advantageously be added to the flavorant to achieve the respective desired results. Alternatively, if the flavorant is formulated specifically for processing into a dry beverage mix in accordance with the present invention, standard flavorant formulations may be directly adapted for use by the addition of any desired optional ingredient not set forth in the standard formulation.

The slurry admixture of flavorant, sugar, gum and dipeptide and any optional ingredients is then dried to substantial dryness using conventional vacuum or freeze-drying techniques to produce a dry crystalline matrix. As used herein, "substantial dryness" is the state at which the dried material feels dry to the touch, is free-flowing after being ground, and can be packaged similarly to conventional powders or granules without coating on or adhering to the package side walls. This will typically involve drying to a final moisture content of less than about 3%, preferably, to less than about 1%, and most preferably, to about 0.1%. In keeping with the present invention, it is important that the slurry by dried by vacuum drying, or equivalent techniques, which cause the drying material to form a stable foam so as to form a beverage mix which is rapidly dissolvable in water requiring only a minimum amount of agitation. In the practice of the present invention, the slurry is placed in a relatively thin layer on a belt, conveyor, or on trays and dried under vacuum conditions. The slurry may be frozen before drying, but in any event, it is important that the integrity of a porous physical structure be retained during the vaporization of moisture. Specific vacuum drying techniques are known to those skilled in the art and will not be repeated herein for purposes of brevity. It has been found that best results are obtained if the slurry is dried within a period of about 36 hours, and preferably about 24 hours. The temperature of the slurry should be kept below 125° F and preferably below 90° F during the drying process. In the practice of the present invention, it has been found that vacuum drying techniques may be advantageously employed. Again, any of the conventional freeze-drying techniques known to those skilled in the art are suitable for the practice of the present invention as long as a stable foam is produced from the slurry during dehydration.

The dried product resulting from the dehydration step is then ground by conventional size reduction techniques so as to make it more readily dissolvable when added to water and to enhance the appearance of the final product. Depending upon the fineness to which the particles are ground, they may either be screened to obtain groups of approximately uniform particle size, or the dried mix may be ground to a fine particle size and agglomerated using conventional agglomeration techniques. After grinding to a suitable particle size, the dry stable diet-flavor crystals are packaged in suitable aliquot portions for subsequent dissolution in a predetermined amount of water to obtain flavorful beverage ready for either carbonation or direct consumption.

The dry diet-flavor crystals resulting from the practice of the present invention are unique in that a flavorful, sweetened diet beverage results within one minute after their addition to water and a minimum of agitation, whereas with conventional dry diet beverage mixes, prolonged mixing and a waiting time of at least several minutes is necessary before the mix is fully dissolved. The dry flavored crystals of the present invention are uniformly colored. Of course, the color will vary for different flavors and the food coloring added for the respective flavors, but due to the manner of drying the slurry, each flavor will retain a deep, rich color typical of that beverage flavor. This is in marked contrast to conventional dry mixes, which either have a "speckled" appearance due to the separate particles of sugar and colored flavor, or have a uniform "bland" appearance with no noticeable color provided for aesthetic appeal to the consumer.

The dry flavor crystals of the present invention can be added to water and immediately consumed as a low-calorie, flavorful, sweetened drink, or can be made a part of a dry carbonated beverage mix. If the dry flavor crystals of the present invention are to be used in a dry mix adapted for making carbonated beverages, the dry crystals can be advantageously employed with a variety of carbonation systems to provide suitably carbonated, flavorful beverages. For instance, the dry beverage crystals as disclosed herein can be added to precarbonated water, or, the dry beverage crystals can be combined with an economical point-of-consumption carbonation system and this combination then added to tap water to provide a convenient, carbonated beverage. Examples of suitable sources of pre-carbonated water are the use of bottled precarbonated water, commonly known as "club soda" or the use of pressure carbonators which utilize CO₂-charged cylinders to carbonate water as it is dispensed, such as is done at a soda fountain. Examples of point-of-consumption systems which utilize regular tap water for the beverage include the use of a "chemical couple" such as those disclosed in Mitchell et al., U.S. Pat. No. 3,241,977, issued Mar. 22, 1966, or Hovey, U.S. Pat. No. 3,492,671, issued Jan. 27, 1970; or the use of CO₂-loaded zeolite molecular sieves, such as that disclosed in pending U.S. patent application, Ser. No. 302,149, filed Oct. 30, 1972 and incorporated herein by reference in its entirety.

The latter-named carbonation system, i.e., the use of CO₂-loaded zeolite molecular sieves, is especially preferred in the practice of the present invention. Molecular sieves of this type are crystalline aluminosilicate materials of the following general formula:

$$M_{2/n}O \cdot SiO_2 \cdot aAl_2O_3 \cdot bH_2O$$

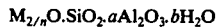

in the salt form, where $n$ is the valence of a metal cation M, M ordinarily is Na or K but may be other cations substituted by exchange, $a$ is the number of moles of alumina, and $b$ is the number of moles of water of hydration. Due to the crystalline nature of such materials, the diameters of the surface cavities and of the internal pores are substantially constant and are of molecular magnitude. For this reason, the crystalline aluminosilicates have found wide use in the separation of materials according to molecular size or configuration, hence the name molecular sieves. Upon removal of at least some of the water of hydration by heating, the crystalline aluminosilicates becomes highly porous and are characterized by a series of surface cavities and internal pores which form an interconnecting network of passageways within the crystal. Such dehydrated molecular sieves are often referred to as "activated", meaning that they are ready to selectively absorb molecules of a given size. Carbon dioxide is strongly absorbed, or "loaded", on such sieves, by can subsequently be displaced by the stronger and preferential absorption of water. Hence, the release of abosrbed CO₂ from molecular sieves upon contact with an aqueous potable liquid provides a convenient and economical point-of-consumption beverage carbonation system. By employing molecular sieves loaded with carbon dioxide to the extent of at least 5% by weight of the molecular sieves and by carbonating a beverage at temperatures of from about 35° to about 70° F (the temperature of the beverage) and atmospheric pressures, suitably carbonated beverages can be obtained in about 1–10 minutes. As might be expected, increasing the quantity of molecular sieves employed for a given amount of beverage solution increases the amount of carbon dioxide released. Although the optimum amount of molecular sieves employed will vary with the characteristics of the particular sieve type employed and the beverage solution to be carbonated, the preferred quantity of molecular sieves ranges from about 0.5 gram to about 4 grams of molecular sieves (before loading) per fluid ounce of beverage to be carbonated.

It is important that the dry flavor crystals of the present invention be packaged in a moisture-proof container, in that the crystalline physical structure collapses when wetted, due to the extremely rapid dissolution rate. A convenient method for insuring that these flavor crystals are not degraded by exposure to moisture during storage periods is to have them packaged in the presence of a desiccant. The CO₂-loaded molecular sieves disclosed in the above-mentioned pending U.S. patent application is a suitable desiccant for such purposes. Thus, the presence of such CO₂-loaded zeolite molecular sieves in combination with the dry flavor mix has multiple advantages in that they provide protection of the flavor crystals during storage, provide a convenient and sufficient carbonation system during use, and the effervescent action resulting from the molecular sieves immersed in water is sufficient to provide adequate agitation for the dissolution of the dry flavor crystals of the instant invention.

If dry diet cola-flavor crystals are desired, it is desirable that a mono-alkali orthophosphate be added to the cola base containing phosphoric acid, in accordance with co-pending application of Timothy J. Kennedy, entitled "Dry Stable Instant Beverage Mix", Ser. No. 489,291, filed on July 17, 1974.

The dry flavor crystals of the present invention can be dry mixed with dry antifoam additives such as those in accordance with the co-pending application of Gyanendra Singh, "Solid Antifoam Crystals for Dry Beverage Mix", filed of even date, Ser. No. 570,333, incorporated herein by reference.

The following Examples serve to illustrate various embodiments of the invention and are not intended to limit the invention in any way.

EXAMPLE 1

One hundred twenty grams of powdered (10X) sucrose, 64.2 grams of Aspartame, 73.2 grams of monosodium phosphate, 18.0 grams of sodium carboxymethylcellulose gum 9M8XF, supplied by Hercules, Inc., Wilmington, Del., and 6 grams of USP caffeine were mixed intensively. All the dry ingredients were of the approximate same particle size to prevent segregation during mixing. The resulting dry ingredients were then mixed with 527 grams of a commercially obtainable two-ounce cola base and 16.5 grams of 85% syrupy phosphoric acid and 3 grams of vanilla extract in a high-speed blender such that air was incorporated in the slurry. The slurry was then immediately spread on stainless steel pans and dried at 29° C for 24 hours in a Stokes Freeze Dryer, supplied by Equipment Division, Pennsalt Chemicals, Philadelphia, Pa., at a pressure less than 150 microns of mercury. The dried crystalline material was ground to form small crystals. 12 oz. beverages were prepared with water using from 1.5 to 2 grams of the dry flavor crystals per beverage. These flavor crystals completely dissolved within 30 seconds to one minute.

EXAMPLE 2

Same as Example 1 except that 36.0 grams of 7LF carboxymethylcellulose gum was used instead of the 18.0 grams of 9M8XF. It is noted that the flavor crystals made from Example 2 were not as soluble as those of Example 1.

Sodium carboxymethylcellulose, 9M8XF, has 9 carboxymethyl groups substituted per 10 anhydroglucose units and a viscosity of 400–800 centipoises at 2% by weight solution.

7LF is a sodium carboxymethylcellulose gum where 7 carboxymethyl groups are substituted per 10 anhydroglucose units and has a viscosity of 25 to 50 centipoises at a 2% by weight aqueous concentration at 20° C, supplied by Hercules, Inc., Wilmington, Del. The Aspartame used in the above examples is N-L-α-Aspartyl-L phenylalanine 1-methyl ester, and is supplied by the G. D. Searle & Co., Skokie, Ill. 60076.

What is claimed is:

1. A stable, substantially dry crystalline, rapidly dissolvable diet beverage composition comprising a porous uniform matrix of
   a. from 5% to 55% of a dipeptide sweetener;
   b. from 1% to 15% edible gum;
   c. from 7% to 30% of a crystalline sugar carrier; and
   d. from 25% to 85% of a beverage flavorant; and
wherein said substantially dry crystalline rapidly dissolvable diet beverage composition is made from a process which comprises:
   e. forming a dry mixture of a dipeptide sweetener, a crystalline sugar carrier, and a water-soluble, edible gum;
   f. forming a homogeneous slurry by uniformly mixing said dry mixture with a liquid flavorant, thereby to provide a slurry comprising by weight of from 35% to 70% of said flavorant, 2% to 45% of said dipetide sweetener, 5% to 30% of said crystalline sugar carrier and 1% to 15% of said watersoluble, edible gum; and wherein said homogeneous slurry has a total solids content of about 50% to about 75%;
   g. drying said homogeneous slurry in such manner as to provide a stable, porous, substantially dry, and rapidly dissolving diet beverage crystalline matrix.

2. The composition of claim 1, wherein said edible gum is sodium carboxymethylcellulose.

3. The composition of claim 1 wherein said powdered crystalline sugar is sucrose.

4. The composition of claim 1 wherein said flavorant is a cola base flavorant containing phosphoric acid and said composition additionally contains a mono-alkali orthophosphate.

5. The composition of claim 1 wherein said sweetener is N-L-α-aspartyl—L—phenylalanine 1-methyl ester.

6. The composition of claim 1 wherein said dipeptide sweetener is N-L-α-aspartyl-L phenylalanine 1-methyl ester, said powdered crystalline sugar is sucrose, and said flavorant is a cola bae flavorant containing phosphoric acid and said composition additionally contains a mono-alkali orthophosphate.

7. A process for making a substantially dry crystalline rapidly dissolvable diet beverage composition comprising
   a. forming a dry mixture of a dipeptide sweetener, a crystalline sugar carrier, and a water-soluble edible gum;
   b. forming a homogeneous slurry by uniformly mixing said dry mixture with a liquid flavorant, thereby to provide a slurry comprising by weight of from 35% to 70% of said flavorant, 2% to 45% of said dipeptide sweetener, 5% to 30% of said crystalline sugar carrier and 1% to 15% of said water-soluble edible gum; and wherein said homogeneous slurry has a total solids content of about 50% to about 75%;
   c. drying said homogeneous slurry in such manner as to provide a stable, porous, expanded, substantially dry, and rapidly dissolving diet beverage crystalline matrix.

8. The process in accordance with claim 7, wherein said dipeptide sweetener is N-L-α-aspartyl-L phenylalanine 1-methyl ester.

9. The process in accordance with claim 7 wherein said edible gum is sodium carboxymethylcellulose.

10. The process in accordance with claim 7, wherein said liquid flavorant comprises a cola base flavorant containing phosphoric acid and said composition additionally contains a mono-orthophosphate.

11. The process in accordance with claim 7 wherein said dipeptide sweetener is N-L-α-aspartyl-L phenylalanine 1-methyl ester, said crystalline sugar carrier is sucrose, said edible gum is a sodium carboxymethylcellulose gum, and said liquid flavorant is a cola base flavorant containing phosphoric acid and said composition additionally contains a mono-alkali orthophosphate.

12. The process in accordance with claim 7, wherein said slurry is dried at a temperature below 80° C.

13. The process in accordance with claim 12, wherein said slurry is vacuum-dried.

14. The process in accordance with claim 12, wherein said slurry is freeze-dried.

* * * * *